United States Patent
Sadowara et al.

(10) Patent No.: US 6,587,651 B2
(45) Date of Patent: Jul. 1, 2003

(54) IMAGE FORMING APPARATUS AND METHOD OF CONTROLLING THE APPARATUS

(75) Inventors: Tetsuya Sadowara, Kawasaki (JP); Hideaki Fukaya, Chiba (JP); Eiichi Yamanishi, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/281,957

(22) Filed: Oct. 29, 2002

(65) Prior Publication Data
US 2003/0049037 A1 Mar. 13, 2003

Related U.S. Application Data

(63) Continuation of application No. 09/813,283, filed on Mar. 21, 2001, now abandoned.

(51) Int. Cl.⁷ .............................................. G03G 15/00
(52) U.S. Cl. ............................... 399/27; 399/79; 399/81
(58) Field of Search ........................... 399/24, 27, 28, 399/79, 81; 358/1.9

(56) References Cited

U.S. PATENT DOCUMENTS

| 5,459,556 A | 10/1995 | Acquaviva et al. |
| 5,850,584 A | 12/1998 | Robinson et al. |
| 5,864,408 A | 1/1999 | Kumashiro |
| 6,064,838 A | 5/2000 | Maruta et al. |

FOREIGN PATENT DOCUMENTS

| JP | 10-105011 A | 4/1998 |
| JP | 11-184336 A | 7/1999 |

*Primary Examiner*—Joan Pendegrass
(74) *Attorney, Agent, or Firm*—Foley & Lardner

(57) ABSTRACT

The density of an image read by a scanner unit 1 is recognized. A consumption of tonor required for development in each of development units 69y, 69m, 69c and 69k is detected according to the results of the recognition. The detected consumption is displayed on a liquid crystal display unit 44.

15 Claims, 8 Drawing Sheets

IMAGE FORMING APPARATUS AND METHOD OF CONTROLLING THE APPARATUS

This is a Continuation Application of application Ser. No. 09/813,283, filed Mar. 21, 2001 now abandoned.

BACKGROUND OF THE INVENTION

In image forming apparatuses, such as copying machines, when the print key is pressed, the image of an original document set on the document mount is read optically and an electrostatic latent image corresponding to the read image is then formed on the surface of the sensitized drum as an image bearing body.

The electrostatic latent image formed on the surface of the sensitized drum is rendered visible by developer, for example, tonor, supplied from a development unit. On the other hand, a sheet of copying paper is taken out of the paper feed cassette and then fed to the sensitized drum. The visualized image is then transferred to the copying paper. The copying paper is then separated from the surface of the sensitized drum and sent to the fixing unit, which in turn fixes the transferred image to the paper by heat. The copying paper having the image fixed is then discharged to the outside of the apparatus.

The users of such image forming apparatuses usually wait, standing at the side of the apparatus throughout the time from when the print key is pressed until the copying paper is discharged to the outside of the apparatus. Busy users may feel the waiting time to be very long.

The tonor is expendable and requires replacement corresponding to its rate of consumption. It is demanded that the cost of these items be minimized.

BRIEF SUMMARY OF THE INVENTION

It is an object of the present invention to provide an image forming apparatus and a method of controlling the apparatus which can make use of the user's waiting time to thereby relive the chore of waiting and, at the same time, permit the user to have exact knowledge of a consumption of developer or the cost thereof.

An image forming apparatus of the present invention comprises:
an image bearing body;
a scanning unit for optically scanning across the surface of the image bearing body to form a latent image on the surface of the image bearing body;
a developing unit for supplying developer to the image bearing body to develop the latent image on the surface of the image bearing body;
a transfer unit for transferring the image on the surface of the image bearing body developed by the developing unit onto an image forming medium;
a detecting unit for detecting the consumption of developer required for development by the developing unit; and
a display unit for displaying the consumption detected by the detecting unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

[1] A description is given of a first embodiment of the present invention.

Figure 1:
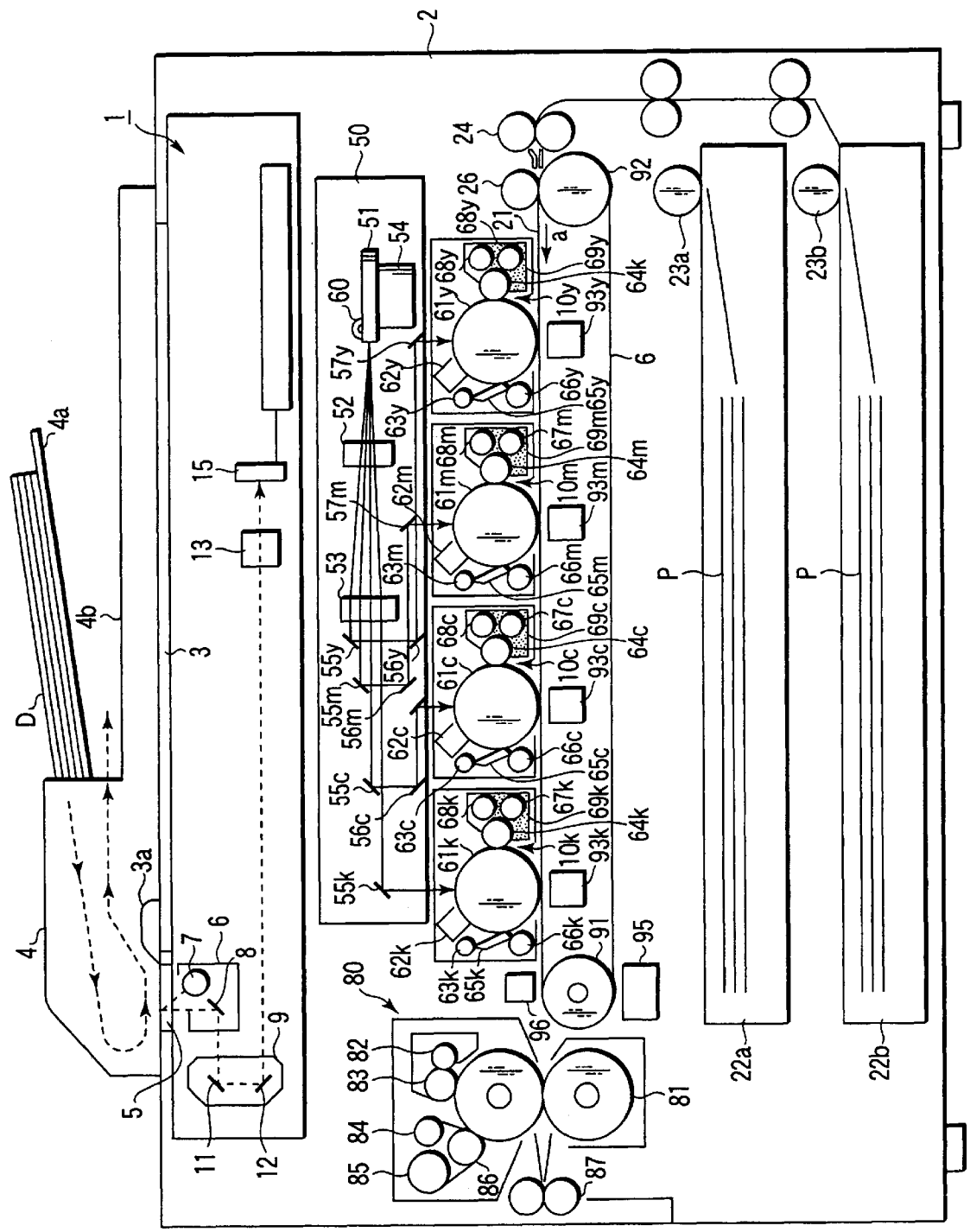
FIG. 1 shows the entire configuration of the embodiments.

FIG. 1 is a schematic illustration of the internal structure of an image forming apparatus such as a digital color copying machine capable of color printing. This image forming apparatus is basically composed of a scanner unit 1 as a reading unit that reads a color image on an original document and a quadruple-tandem-printer unit 2 that forms a duplication of the read color image.

First, the scanner unit 1 will be described.

On the top of the apparatus body there is provided a transparent document mount (transparent glass sheet) 3 on which an original document is set. On the top of the document mount 3 there is provided an automatic document feeder unit (ADF) 4 so that it can be opened and closed. The automatic document feeder unit 4 automatically feeds original documents D set on a tray 4a one at a time to a document read window 5 to be described later and discharges each document D passed through the document read window 5 to a receiving tray 5b.

Below the document mount 3 there is provided a first carriage 6 in which an exposure lamp 7 and a reflecting mirror 8 are provided. The carriage 6, the exposure lamp 7 and the reflecting mirror 8 constitute an exposure unit. The carriage 6 can reciprocate along the under side of the document mount 3. The document mount 3 is exposed to light when the carriage 6 moves forwards and the exposure lamp 7 is lit.

This exposure allows the reflected optical image of the document D set on the document tray 3 to be produced, which is in turn projected through the reflecting mirror 8, reflecting mirrors 11 and 12 in a second carriage 9 and a variable-power lens block 13 onto a CCD (Charge Coupled Device) 15.

The direction in which the carriage 4 moves forwards is referred to as the subscanning direction and the direction perpendicular to the subscanning direction is referred to as the main scanning direction.

An indicator 3a is attached to the document mount 3. The boundary between the indicator 3a and the document mount 3 provides the reference position for setting an original document. The document D is set to that reference position.

The document read window 5, consisting of a transparent glass sheet, is provided adjacent to the indicator 3a. The carriage 6 is allowed to move to the position of the document read window 5 and stop there. When the carriage 6 stops under the document read window, the automatic document feeder unit 4 operates, and the exposure lamp 7 is lit, the document D fed from the automatic document feeder unit 4 is exposed through the document read window 5. The reflected optical image passes through the document read window 5 and is then projected onto the CCD 15 through the reflecting mirrors 8, 11 and 12 and the variable-power lens block 13.

The CCD 15 comprises a large number of photoelectric transfer elements and produces image signals (electric signals) corresponding to the three primary colors of R (red), G (green) and B (blue) of the incoming light. The image signals are converted into digital signals that form read image data. The read image data are processed appropriately in an image processing unit 60 and then applied to a print engine 50 which is a scanning unit. The print engine 50 emits scanning laser beams corresponding to the input image data.

On the other hand, the printer unit 2 includes first through fourth image forming units 10y, 10m, 10c and 10k which form color-separated images on the basis of the known subtractive mixture of colors, i.e., images in four colors of yellow (Y), magenta (M), cyan (C), and black (K), respectively, which are colors to be expressed.

Under the image forming units 10y, 10m, 10c and 10k is placed a conveyance means 20 including a conveyor belt 21, which is stretched between a driving roller 91 rotated by a motor not shown in the direction of arrow a and a slave roller 92 at a predetermined distance from the driving roller 91 and moves at a constant speed in the direction of arrow a. The image forming units 10y, 10m, 10c and 10k are arranged in this order along the direction of movement of the conveyor belt 21.

Sensitized drums 61y, 61m, 61c, and 61k, acting as image bearing bodies, are rotatably fitted to the image forming units 10y, 10m, 10c and 10k. The sensitized drums 61y, 61m, 61c and 61k are arranged so that their axes are spaced at regular intervals. Hereinafter, the direction of the axis of each of the sensitized drums 61y, 61m, 61c, and 61k is determined to be the main scanning direction, whereas the direction of rotation of the sensitized drums 61y, 61m, 61c and 61k (the direction in which the conveyor belt 21 runs) is determined as the subscanning direction.

The sensitized drums 61y, 61m, 61c and 61k are irradiated with laser beams emitted from the print engine 50. The print engine 50 forms an electrostatic latent image corresponding to the image read by the scanner unit 1 (a separate electrostatic latent image for each of the four colors) on the surface of each of the sensitized drums 61y, 61m, 61c, and 61k by scanning their surface with a laser beam.

Around the sensitized drums 61y, 61m, 61c, and 61k are arranged charging units 62y, 62m, 62c and 62k, static eliminator units 63y, 63m, 63c and 63k, developing units 69y, 69m, 69c and 69k, transfer units 93y, 93m, 93c and 93k, cleaning blades 65y, 65m, 65c and 65k, and tonor recovery screws 66y, 66m, 66c and 66k.

The developing units 69y, 69m, 69c and 69k have developing rollers 64y, 64m, 64c and 64k, lower stirring rollers 67y, 67m, 67c and 67k, and upper stirring rollers 68y, 68m, 68c and 68k, contain developer indicated by dots, and supply it to the surface of the sensitized drums 61y, 61m, 61c and 61k through the developing rollers 64y, 64m, 64c and 64k, thereby developing the electrostatic latent images to make them visible.

The developer contained in each of the developing units 69y, 69m, 69c and 69k is toner of a different color for color printing. The toner contained in the developing unit 69y is yellow, the toner contained in the developing unit 69m is magenta, the toner contained in the unit 69c is cyan, and the toner contained in the developing unit 69k is black.

Under the conveyance means 20 are placed paper feed cassettes 22a and 22b that contain a large number of image forming media, for example, sheets of copying paper P. The sheets of copying paper P in the sheet supply cassette 22a and 22b are taken out one at a time by pick-up rollers 23a and 23b. The copying paper P taken out is fed to regist rollers 24, which in turn feeds the copying paper P between the sensitized drum 61y and the transfer unit 93y in synchronization with the rotation of the sensitized drum 61y. An absorption roller 26 is placed between the regist rollers 24 and the sensitized drum 61y to impart electrostatic absorption power to the copying paper P beforehand.

The copying paper P fed past the sensitized drum 61y is fed between the next sensitized drum 61m and transfer unit 93m. The copying paper P fed past the sensitized drum 61m is fed between the next sensitized drum 61c and transfer unit 93c. The copying paper P fed past the sensitized drum 61c is fed between the next sensitized drum 61k and transfer unit 93k.

The transfer units 93y, 93m, 93c and 93k transfer the visible images on the surfaces of the sensitized drums 61m, 61m, 61c and 61k developed by the developing units 69y, 69m, 69c and 69k onto the copying paper P.

The copying paper P fed past the sensitized drum 61k is fed into a fixing unit 80. Between the sensitized drum 61k and the fixing unit 80 a displacement sensor 96 is placed to optically detect the displacement of the copying paper P. Further, a cleaning unit 95 is placed below the driving roller. 91 to keep the conveyor belt 21 clean.

The fixing unit 80 has heating rollers 81, oil coating rollers 82 and 83, a web takeup roller 84, a web roller 85, and a web pressing roller 86 and fixes the image transferred onto the copying paper by heat. The copying paper P past the fixing unit 80 is discharged to the outside of the apparatus body by means of discharging rollers 87.

The print engine 50 includes semiconductor laser oscillators 60 which are subjected to emission control by image data (Y, M, C, K) obtained from an image processor 36 to be described later. On the optical path of laser beams emitted from the semiconductor laser oscillators 60 are provided a polygon mirror 51 and fθ lenses 52 and 53. The polygon mirror 51 is driven to rotate by a polygon mirror 54.

Between the fθ lens 53 and the sensitized drums 61y, 61m, 61c and 71k are provided mirrors 55y, 55m, 55c and 55k which bend the laser beams for the respective colors passed through the fθ lens 53 toward the sensitized drums 61y, 61m, 61c and 61k and mirrors 56y, 56m, 56c, 57y, 57m and 57c which further bend the laser beams bent by the mirrors 55y, 55m, and 55c. The laser beam for black is bent by the mirror 55k and then directly directed onto the surface of the sensitized drum 61 without being reflected by any other mirror.

Figure 2:
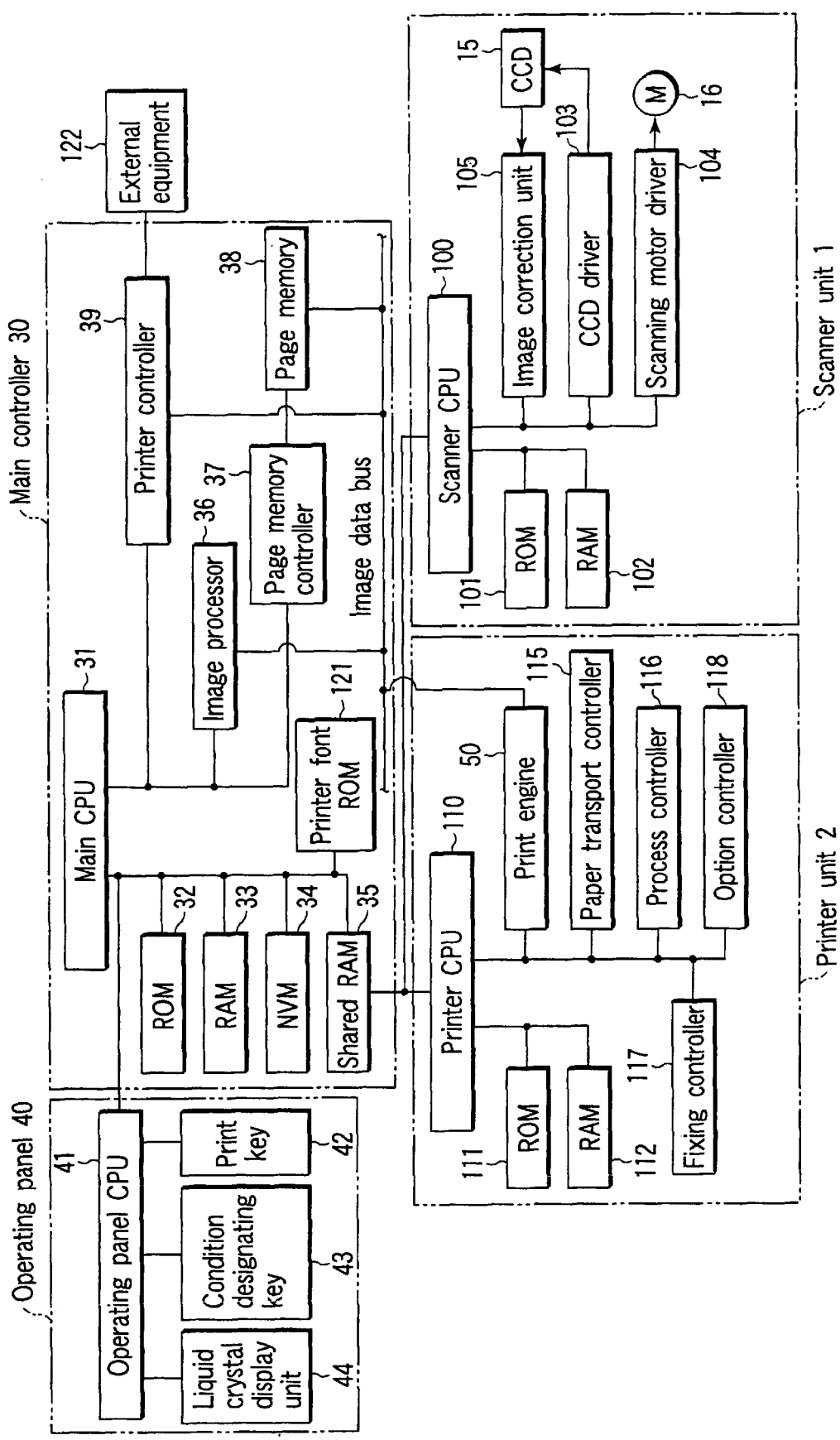
FIG. 2 is a block diagram of the control circuits in the embodiments.

Control circuits are illustrated in FIG. 2.

An operating panel 40 includes an operating panel CPU 41 and is provided in an easy-to-view place in the upper portion of the apparatus body. To the operating panel CPU 41 are connected a print key 42, a condition designating key 43, and a touch panel type liquid crystal display unit 44. The operating panel CPU 41 is also connected to the main CPU 31 in the main controller 30. The condition designating key 43 is used as a first operating unit operated by a user to designate the density of an image to be transferred onto the copying paper P and a second operating unit operated by the user to specify his or her satisfaction with the displayed contents on the liquid crystal display unit 44.

The main controller 30 comprises the main CPU 31, a ROM 32, a RAM 33, an NVM (nonvolatile random access memory: nonvolatile RAM), a shared RAM 35, the image processor 36, a page memory controller 37, a page memory 38, a print controller 39, and a printer font ROM 121.

The main CPU 31 controls the entire apparatus. The ROM 32 stores control programs. The RAM 33 is used for temporary data storage. The NVM 34 is a battery backed-up nonvolatile memory. The shared RAM 35 is used for two-way communications between the main CPU 31 and a printer CPU 110 and between the main CPU 31 and a scanner CPU 100. The page memory controller 37 is used to read or write image data into or out of the page memory 38. The page memory 38 can store a plurality of pages of image data. The printer controller 39 converts print data input from an external device, such as a personal computer, into image data.

The scanner unit 1 comprises the scanner CPU 100, a ROM 101, a RAM 102, a CCD driver 103, a scanning motor driver 104, and an image correction unit 105. The ROM 101 stores control programs etc. The RAM 102 is used for temporary data storage. The CCD driver 103 drives the CCD 15. The scan motor driver 104 drives motors 16 for driving the carriages 8 and 9 and various mirrors.

The image correction unit 105 is composed of A/D converters for converting image signals (R, G and B analog signals) output from the CCD sensor 15 into digital signals, shading correction circuits, line memories, etc.

The main CPU 31 has the following means (1)-(3) as its major functions:
(1) Recognition means (recognition unit) for recognizing the density of an image read by the scanner unit 1 for each pixel.
(2) Detection means (detection unit) for detecting the consumption of tonor by color required for development by the developing units 69y, 69m, 69c, and 69k according to the results of recognition by the recognition means and the density specified by the condition designating key 43 on the operating panel 40.
(3) Control means (control unit) for allowing the toner consumption by color detected by the detection means to be displayed on the display unit 44.

On the other hand, the printer unit 2 comprises the printer CPU 110, a ROM 111, a RAM 112, a paper transport controller 115, a process controller 116, a fixing controller 117, an option controller 118, and a print engine 50. The ROM 11 stores control programs, etc. The RAM 112 is used for temporary data storage. The paper transport controller 115 controls the transportation of paper P. The process controller 116 controls processes of charging, development, transfer, etc.

The image processor 36, the page memory 38, the printer controller 39, the image correction unit 105 and the print engine 50 are interconnected by an image data bus.

Figure 3:
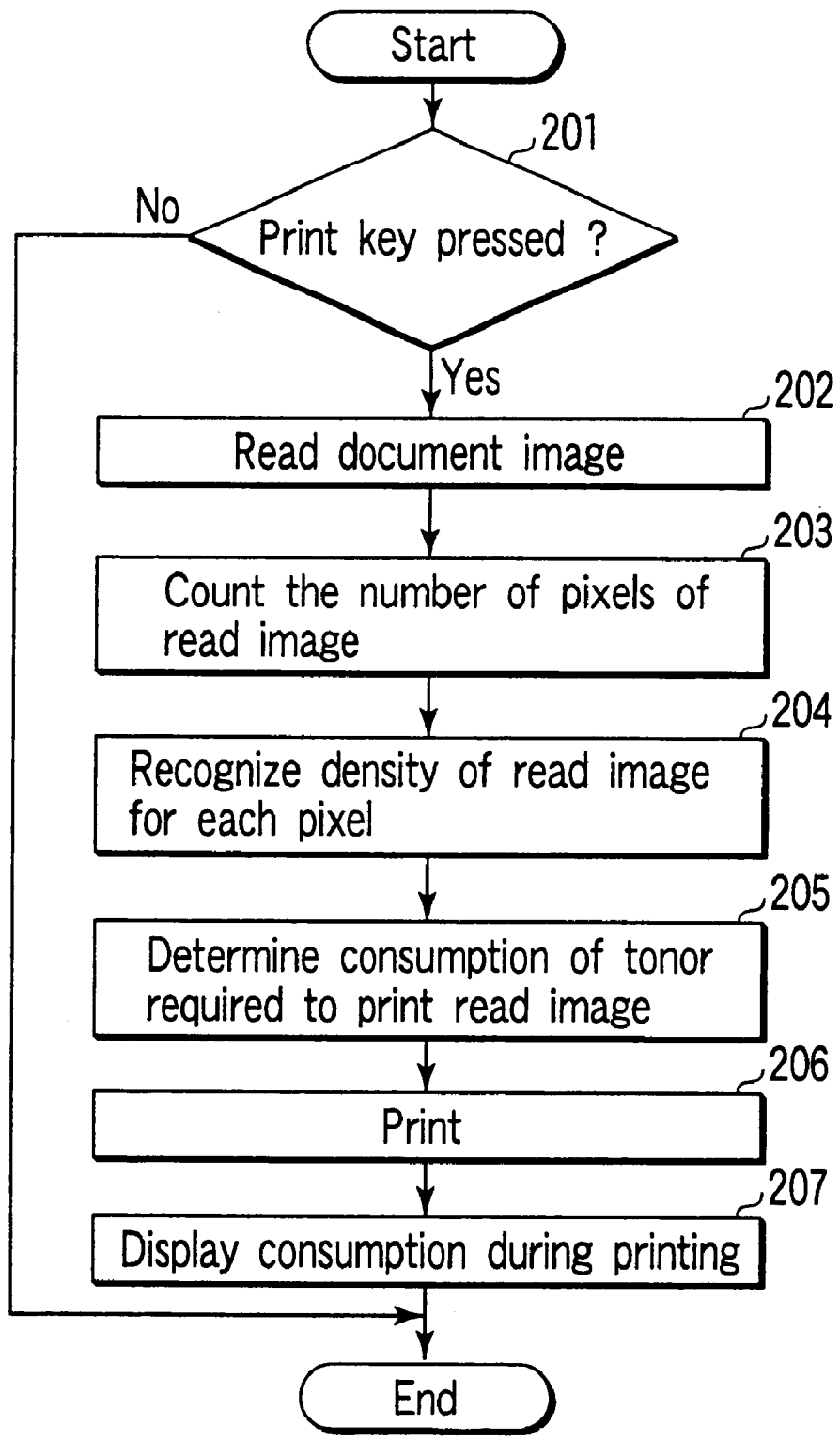
FIG. 3 is a flowchart illustrating the operation of a first embodiment.

The operation of the apparatus thus configured will be described next with reference to FIG. 3.

When an original document D is set on the document mount 3 and the print key 42 is then pressed (YES in step 201), the image on the document D is read optically (step 202). The number of pixels in the read image is counted. (step 203) and the density of the read image is then recognized for each pixel (step 204).

The consumption of tonor required for development in each of the development units 69y, 69m, 69c, and 69k, i.e., the tonor consumption by color, is determined according to the pixel count, the recognized density by pixel, and a density previously specified by the user with the condition designating key 43 on the operating panel 40 (step 205). The printing is then started (step 206). Namely, the read image by the scanner 1 is printed onto copying paper P.

Figure 4:
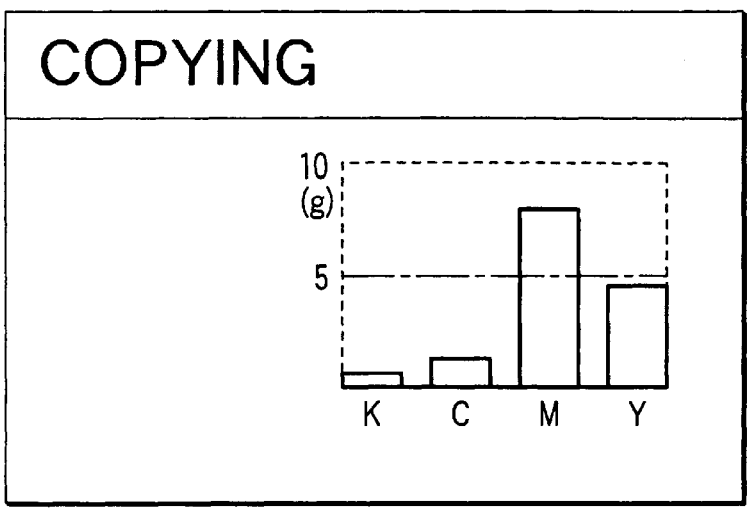
FIG. 4 shows a display on the liquid crystal display unit in the first embodiment.

The tonor consumption by color thus determined is displayed in graphic form on the liquid crystal display unit 44 during printing as shown in FIG. 4 (step 207). Y represents the consumption of yellow tonor required for development in the development unit 69y. M represents the consumption of magenta tonor required for development in the development unit 69m. C represents the consumption of cyan tonor required for development in the development unit 69c. K represents the consumption of black tonor required for development in the development unit 69k.

Watching the display on the liquid crystal display unit 44 during printing reduces the boredom on the user of waiting for completion of printing. At the same time, the user can know the tonor consumption exactly and guess the cost of tonor consumed.

Such a display is likewise made even in the case where some original documents D are set on the tray 4a of the automatic document feed unit 4. That is, when some documents D are set on the tray 4a of the automatic document feed unit 4, it is detected by the automatic document feed unit 4. When the print key 42 is pressed in this state (YES in step 201), the carriage 6 moves to the position opposite the document read window 5 and stops there and the exposure lamp 7 is then lit. The documents D are fed to the document read window 5 one at a time and then discharged to the receiving tray 4b of the automatic document feed unit 4. At this point, each of the documents D is exposed in sequence through the document read window 5 and the image of each document D is read (step 202).

The number of pixels in each read image is counted (step 203) and its density is recognized on a pixel basis (step 204).

A consumption of tonor required for development in each of the development units 69y, 69m, 69c, and 69k, i.e., the tonor consumption by color, is determined for each read image according to the pixel count, the recognized density by pixel, and a density previously specified by the user with the condition designating key 43 on the operating panel 40 (step 205). The printing is then started (step 206). Namely, the read images by the scanner 1 are printed onto sheets of copying paper P.

The tonor consumption by color thus determined is displayed in graphic form on the liquid crystal display unit 44 during printing as shown in FIG. 4 (step 207). The display is switched when each read image is printed.

By watching the display on the liquid crystal display unit 44 during printing, the user can be kept occupied whilst waiting for completion of printing. At the same time, the user can know the tonor consumption exactly and guess the cost of the tonor consumed.

[2] A second embodiment of the present invention will be described.

The main CPU 31 has the following means (11)-(14) as its major functions:

(11) Recognition means (recognition unit) for recognizing the density of an image read by the scanner unit 1 for each pixel.

(12) Detection means (detection unit) for detecting a consumption of tonor required for development by each of the developing units 69y, 69m, 69c, and 69k for each color according to the results of recognition by the recognition means and the density specified with the condition designating key 43 on the operating panel 40.

(13) Control means (control unit) for allowing the toner consumption by color detected by the detection means to be displayed on the display unit 44.

(14) Control means (control unit) for, when satisfaction with the displayed contents (the tonor consumption by color) on the liquid crystal display unit 44 is designated with the condition designating key 43, causing the image forming units 10y, 10m, 10c, and 10k and the print engine 50 to start an operation of image formation.

Otherwise the second embodiment remains unchanged from the first embodiment.

Figure 5A:
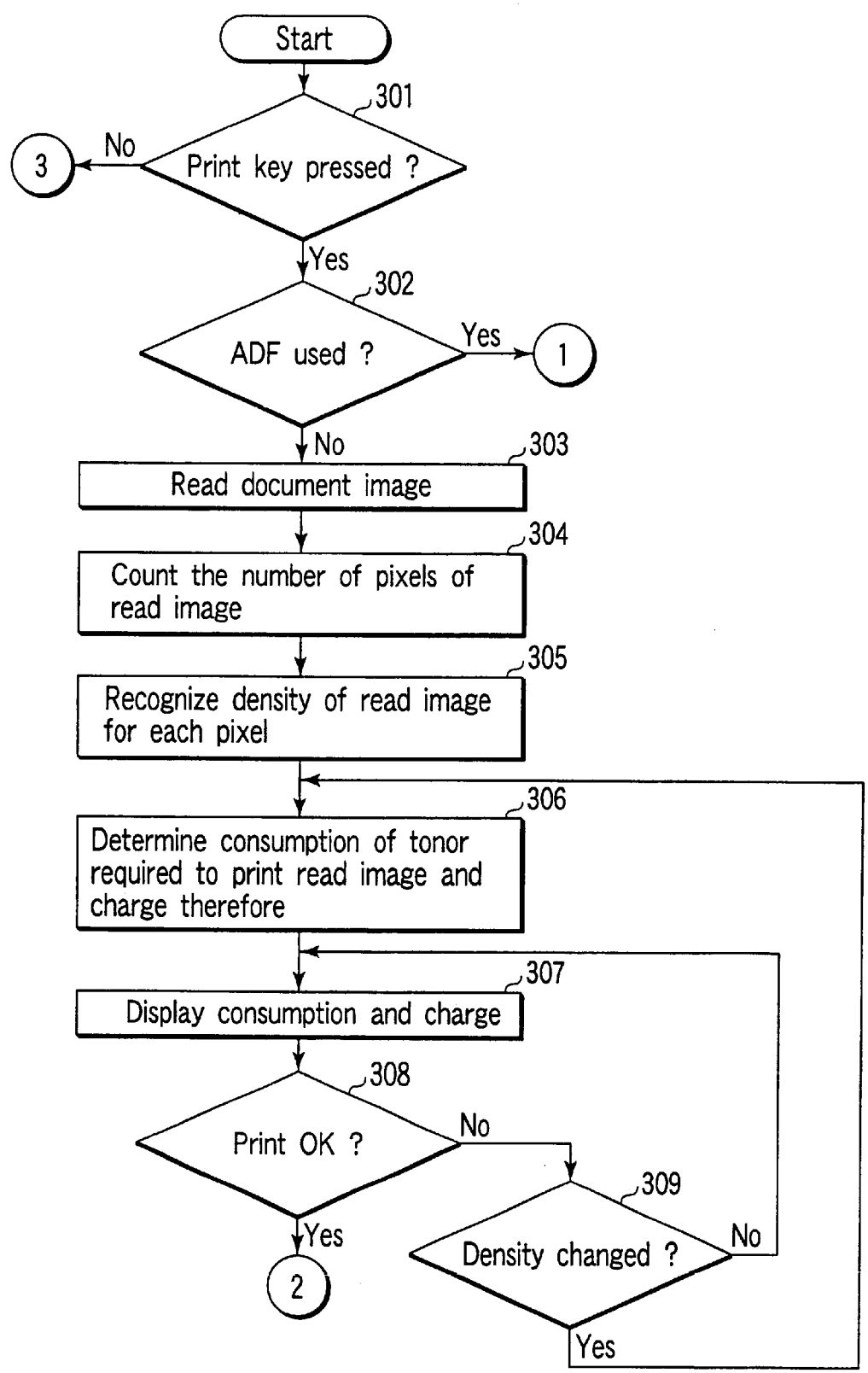
FIGS. 5A and 5B form a flowchart illustrating the operation of a second embodiment.
Figure 5B:
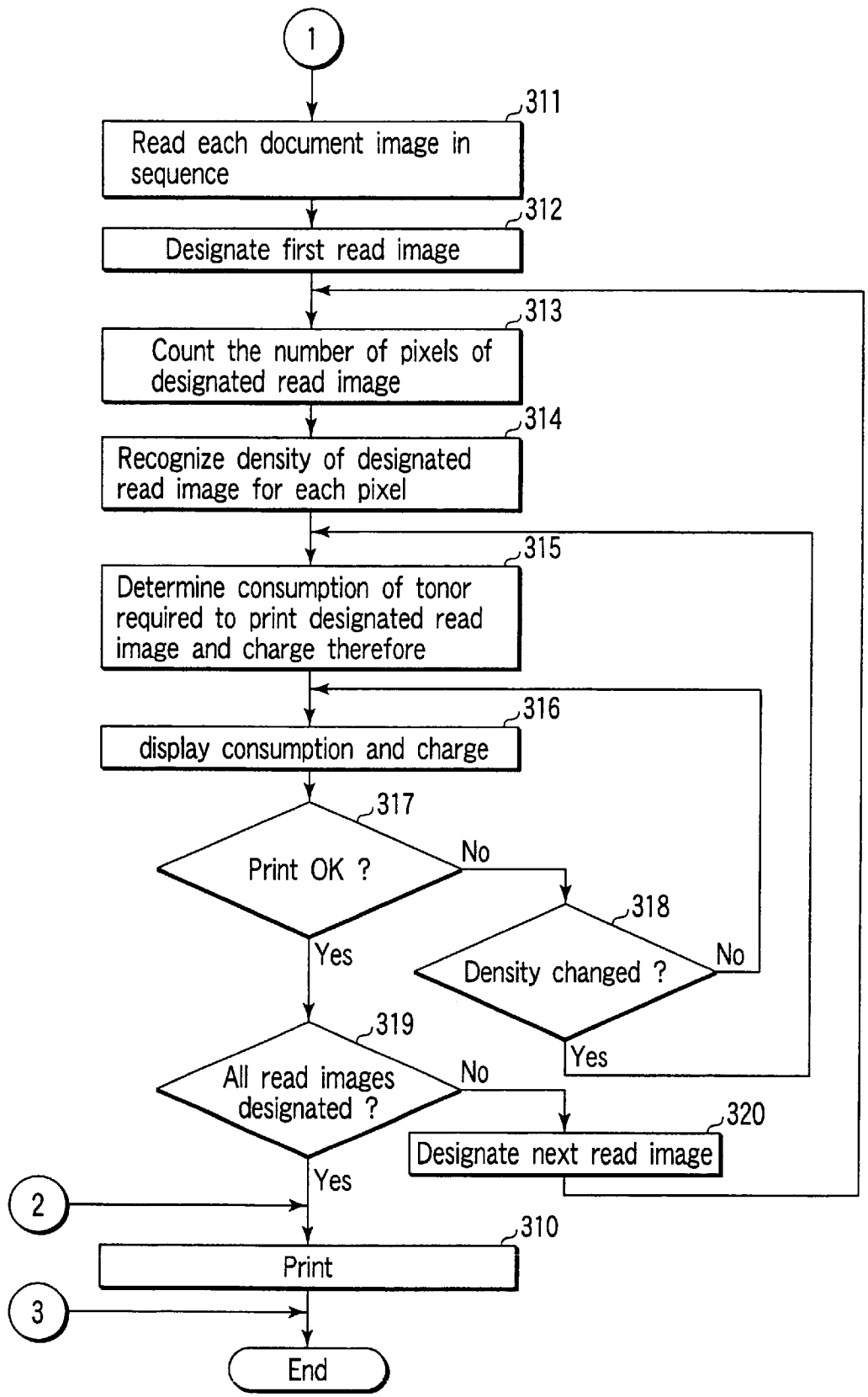

The operation of the second embodiment will be described next with reference to FIGS. 5A and 5B.

When an original document D is set on the document mount 3 and the print key 42 is then pressed (YES in step 301 and NO in step 302), the image on the document D is read optically (step 303). The number of pixels in the read image is counted (step 304) and the contrast of the read image is then recognized on a pixel basis (step 305).

Figure 6:
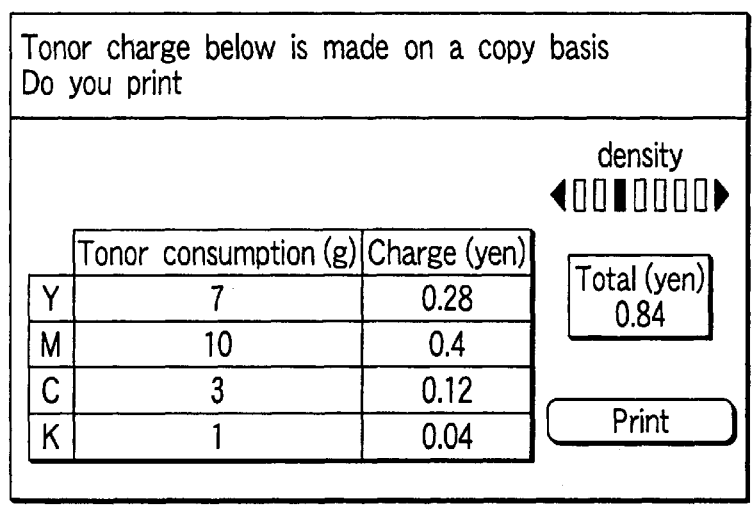
FIG. 6 shows a display on the liquid crystal display unit in the second embodiment.

The consumption of tonor required for development in each of the development units 69y, 69m, 69c, and 69k and a charge for the tonor consumption (also called a bill) are determined for each color according to the pixel count, the recognized density by pixel, and a density previously specified by the user with the condition designating key 43 on the operating panel 40 (step 306). The tonor consumption and the charge by color are displayed in the form of a mapping table on the liquid-crystal display unit 44 as shown in FIG. 6 (step 307). The display screen contains a display of a message to the user, a display of a density pattern representing the density designated with the condition designating key 43, a display of the total charge, and a display of a print pattern which, when the user is satisfied with the displayed contents, is touched by him or her to designate satisfaction.

By viewing the display on the liquid crystal display unit 44, the user is allowed to know the tonor consumption and the charge therefor (cost) exactly before printing is started.

In this case, if the user decides that the image can be printed at a sufficient density even with reduced tonor consumption, he or she operates the condition designating key 43 to change the designated 20 density in a direction to reduce it. Conversely, when deciding that the tonor consumption is too small, the user can operate the condition designating key 43 to change the designated density in the direction to increase it.

When the condition designating key 43 is operated to change the designated density (NO in step 308 and YES in step 309), the process in step 306 is carried out again. That is, a consumption of tonor required for development in each of the development units 69y, 69m, 69c, and 69k and a charge for the tonor consumption are determined for each color according to the pixel count, the recognized density by pixel, and a new density designated with the condition designating key 43 (step 306). The tonor consumption and the charge therefor by color are displayed on the liquid-crystal display unit 44 as shown in FIG. 6 (step 307). When the designated density is changed, the density pattern display on the display screen of the liquid crystal display unit 44 changes accordingly.

When the user is satisfied with the displayed contents on the liquid crystal display unit 44, he or she designates the satisfaction (print OK) by operating the condition designating key 43 or touching the print pattern display on the display screen of the liquid crystal display unit 44 (YES in step 308). This operation causes printing to be started on the basis of the density designated with the condition designating key 43 (step 310).

On the other hand, when some documents D are set on the tray 4a of the automatic document feed unit 4, it is detected by the automatic document feed unit 4. When the print key 42 is pressed in this state (YES in step 301 and YES in step 302), the carriage 6 moves to the position opposite the document read window 5 and stops there and the exposure lamp 7 is then lit. The set documents D are fed to the document read window 5 one at a time and then discharged to the receiving tray 4b of the automatic document feed unit 4. At this point, each of the documents D is exposed in sequence through the document read window 5 and the image of each document D is read (step 311).

Of those read images, the first one is designated (step 312), the number of pixels of the designated read image is counted (step 313), and the density of the read image is recognized on a pixel basis (step 314).

The consumption of tonor required for development in each of the development units 69y, 69m, 69c, and 69k and a charge for the tonor consumption are determined for each color according to the pixel count, the recognized density by pixel, and a density previously specified by the user with the condition designating key 43 on the operating panel 40 (step 315). The tonor consumption and the respective charge by color are displayed on the liquid-crystal display unit 44 as shown in FIG. 6 (step 316).

By viewing the display on the liquid crystal display unit 44, the user is allowed to know the tonor consumption and the charge therefor (cost) regarding the first print exactly before the printing is started.

In this case, if the user decides that the image can be printed at a sufficient density even with reduced tonor consumption, he or she operates the condition designating key 43 to change the designated density in a direction to reduce it. Conversely, when deciding that the tonor consumption is too small, the user can operate the condition designating key 43 to change the designated density in the direction to increase it.

When the condition designating key 43 is operated to change the designated density (NO in step 317 and YES in step 318), the process in step 315 is carried out again. That is, the consumption of tonor required for development in each of the development units 69y, 69m, 69c, and 69k and a charge for the tonor consumption are determined for each color according to the pixel count, the recognized density by pixel, and a new density designated with the condition designating key 43 (step 315). The tonor consumption and the charge therefor by color are displayed on the liquid-crystal display unit 44 as shown in FIG. 6 (step 316). When the designated density is changed, the density pattern display on the display screen of the liquid crystal display unit 44 changes accordingly.

When satisfied with the displayed contents on the liquid crystal display unit 44, the user designates satisfaction (print OK) by operating the condition designating key 43 or touching the print pattern display on the display screen of the liquid crystal display unit 44 (YES in step 317).

In this operation, if all the read images have not been designated yet (NO in step 319) then the next second image is designated (step 320). The processes starting with step 213 are repeated on the designated second read image.

If all the read images have been designated (YES in step 319), then printing is started on the basis of the density designated with the condition designating key 43 for each read image (step 310).

Thus, by displaying the tonor consumption and the charge therefor on the liquid crystal display unit 44, use can be made of the time the user is waiting, thereby relieving the boredom of waiting for completion of printing. Thus the user can see the exact tonor consumption and the charge therefor exactly prior to the start of printing, which, when necessary, allows the user to adjust the tonor consumption to avoid wastage of tonor. A reduction in cost will also be effected.

[3] A third embodiment of the present invention will be described.

Figure 7A:
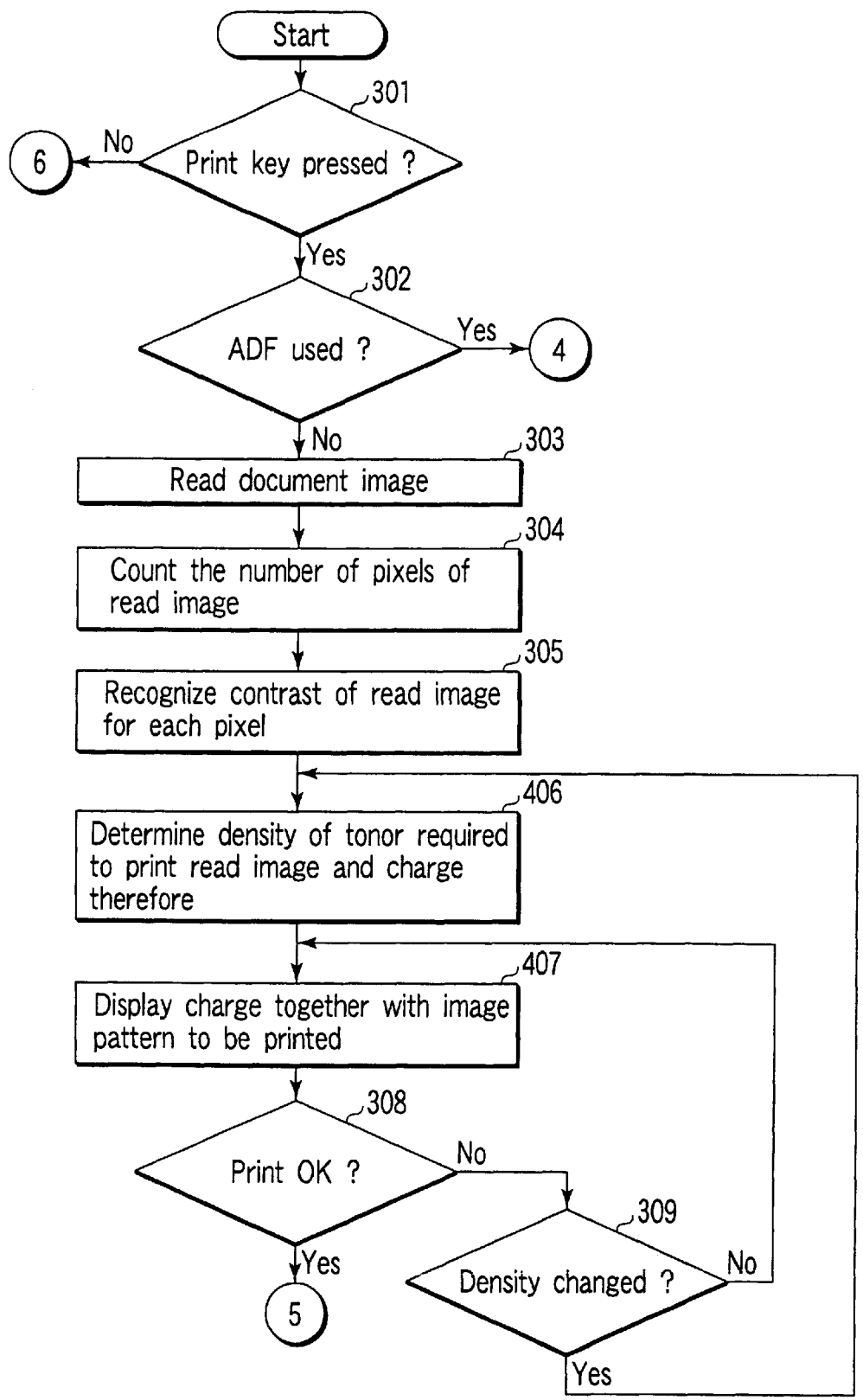
FIGS. 7A and 7B form a flowchart illustrating the operation of a third embodiment.
Figure 7B:
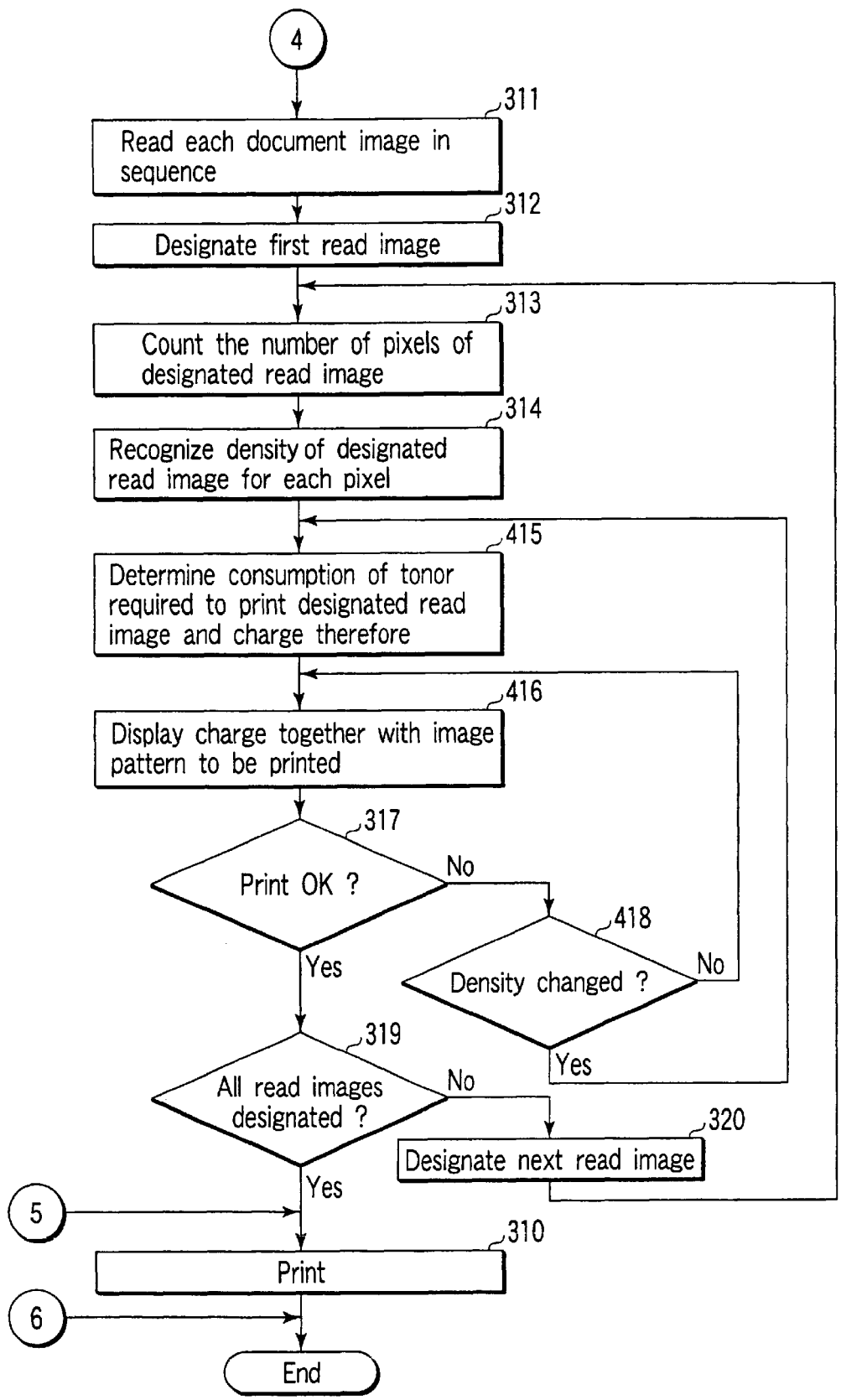

As shown in FIGS. 7A and 7B, steps 406 and 407 are carried out in place of steps 306 and 307 in the second embodiment and steps 415 and 416 are carried out in place of steps 315 and 316 in the second embodiment.

Otherwise, the third embodiment remains unchanged from the second embodiment.

When an original document D is set on the document mount 3 and the print key 42 is then pressed (YES in step 301 and NO in step 302), the image on the document D is read optically (step 303). The number of pixels in the read image is counted (step 304) and the contrast of the read image is then recognized on a pixel basis (step 305).

Figure 8:
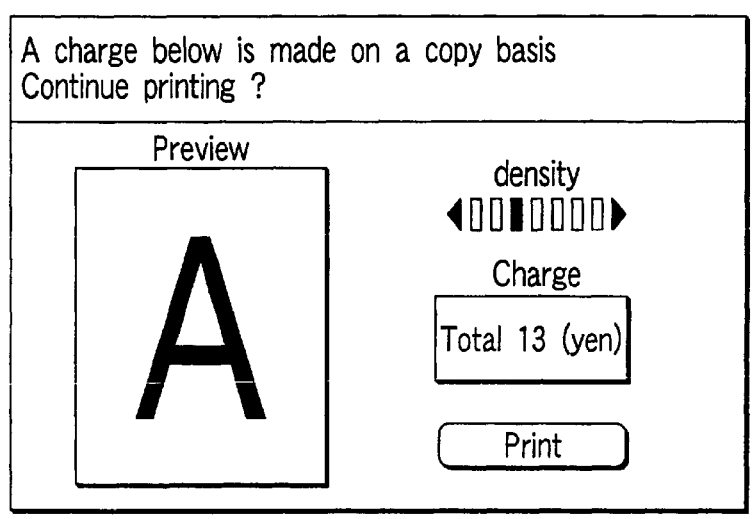
FIG. 8 shows a display on the liquid crystal display unit in the third embodiment.

The consumption of tonor required for development in each of the development units 69y, 69m, 69c, and 69k and a charge for the tonor consumption (also called a bill) are determined for each color according to the pixel count, the recognized density by pixel, and a density previously specified by the user with the condition designating key 43 on the operating panel 40 (step 406). The total of charges by color is displayed on the liquid-crystal display unit. 44 as shown in FIG. 8 (step 407). The display screen contains a display of a message to the user, a display of a density pattern representing the density designated with the condition designating key 43, a display of the total charge, a display of a print pattern which, when the user is satisfied with the displayed contents, is touched by him or her for designating the satisfaction. It also displays a preview for displaying the image which is the subject of image formation, namely, the image pattern to be printed now, as it will appear when it is printed out.

By viewing the display on the liquid crystal display unit 44, the user is allowed to know the charge for tonor used (cost) exactly before printing is started and see what the printed image will look like from the preview display.

In this case, if the user decides that the image can be printed at a sufficient density even with reduced tonor consumption, he or she operates the condition designating key 0.43 to change the designated density in a direction to reduce it. Conversely, when deciding that the tonor consumption is too small, the user can operate the condition designating key 43 to change the designated density in the direction to increase it.

When the condition designating key 43 is operated to change the designated density (NO in step 308 and YES in step 309), the process in step 406 is carried out again. That is, the consumption of tonor required for development in each of the development units 69y, 69m, 69c, and 69k and a charge for the tonor consumption are determined for each color according to the pixel count, the recognized density by pixel, and the new density designated with the condition designating key 43 (step 406). The total of charges by color is displayed on the liquid-crystal display unit 44 as shown in FIG. 8 (step 407). When the designated density is changed, the density pattern display on the display screen of the liquid crystal display unit 44 changes accordingly, and the density of the image pattern preview-displayed on the same display screen changes, too.

When satisfied with the displayed contents on the liquid crystal display unit 44, the user designates the satisfaction (print OK) by operating the condition designating key 43 or touching the print pattern display on the display screen of the liquid crystal display unit 44 (YES in step 308). This operation allows printing to be started on the basis of the density designated with the condition designating key 43 (step 310).

On the other hand, when some documents D are set on the tray 4a of the automatic document feed unit 4, it is detected by the automatic document feed unit 4. When the print key 42 is pressed in this state (YES in step 301 and YES in step 302), the carriage 6 moves to the position opposite the document read window 5 and stops there and the exposure lamp 7 is then lit. The set documents D are fed to the document read window 5 one at a time and then discharged to the receiving tray 4b of the automatic document feed unit 4. At this point, each of the documents D is exposed in sequence through the document read window 5 and the image of each document D is read (step 311).

Of those read images, the first one is designated (step 312), the number of pixels of the designated read image is counted (step 313), and the density of the read image is recognized on a pixel basis (step 314).

The consumption of tonor required for development in each of the development units 69y, 69m, 69c, and 69k and a charge for the tonor consumption are determined for each color according to the pixel count, the recognized density by pixel, and a density previously specified by the user with the condition designating key 43 on the operating panel 40 (step 415). The total of charges by color is displayed on the liquid-crystal display unit 44 as shown in FIG. 8 (step 416).

By viewing the display on the liquid crystal display unit 44, the user is allowed to know the charge for the tonor consumption regarding the first print exactly before printing is started and can see what the printed image will look like from the preview display.

In this case, if the user decides that the image can be printed at a sufficient density even with reduced tonor consumption, he or she operates the condition designating key 43 to change the designated density in a direction to reduce it. Conversely, when deciding that the tonor consumption is too small, the user can operate the condition designating key 43 to change the designated density in the direction to increase it.

When the condition designating key 43 is operated to change the designated density (NO in step 317 and YES in step 318), the process in step 315 is carried out again. That is, the consumption of tonor required for development in each of the development units 69y, 69m, 69c, and 69k and a charge for the tonor consumption are determined for each color according to the pixel count, the recognized density by pixel, and the new density designated with the condition designating key 43 (step 415). The total of charges for the tonor consumption by color is displayed on the liquid-crystal display unit 44 as shown in FIG. 8 (step 416). When the designated density is changed, the density pattern display on the display screen of the liquid crystal display unit 44 changes accordingly, and the density of the image pattern preview-displayed on the same display screen changes, too.

When satisfied with the displayed contents on the liquid crystal display unit 44, the user designates the satisfaction (print OK) by operating the condition designating key 43 or touching the print pattern display on the display screen of the liquid crystal display unit 44 (YES in step.317).

In this operation, if all the read images have not been designated yet (NO in step 319), then the next second image is designated (step 320). The processes starting with step 213 are repeated on the designated second read image.

If all the read images have been designated (YES in step 319), then printing is started on the basis of the density designated with the condition designating key 43 for each read image (step 310).

Thus, by displaying the charge for the tonor consumption together with the image pattern to be presently printed out on the liquid crystal display unit 44, use can be made of the time the user is waiting, thereby relieving the boredom of waiting for completion of printing. At the same time, the user can see the exact charge for the tonor consumption and the image to be printed out now exactly prior to the start of printing, which, when necessary, allows the user to adjust the tonor consumption to avoid wastage of tonor. A reduction in cost will also be effected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   a reading unit which reads the image of a document;
   an image bearing body;
   a scanning unit which optically scans across the surface of the image bearing body to form a latent image corresponding to the image read by the reading unit on the surface of the image bearing body;
   a developing unit which supplies developer to the image bearing body to develop the latent image on the surface of the image bearing body;
   a transfer unit which transfers the image on the surface of the image bearing body developed by the developing unit onto an image forming medium;
   a recognition unit which recognizes the density of the image read by the reading unit,
   a first operating unit, operated by a user, which designates the density of the image to be transferred onto the image forming medium;
   a detecting unit which detects a consumption of the developer required for development by the developing unit according to the results of recognition by the recognition unit and the density designated with the first operating unit;
   a display unit;
   a first control unit which displays the consumption detected by the detecting unit and a preview of the image to be transferred onto the image forming medium on the display unit; and
   a second control unit which changes the density of the image preview displayed on the display unit according to an operation of the first operating unit.

2. The apparatus of claim 1, further comprising:
   a second operating unit, operated by the user, which designates satisfaction with the displayed contents on the display unit; and
   a third control unit which causes the image bearing body, the scanning unit, the developing unit, and the transfer unit to start an operation of image formation, when satisfaction is designated with the second operating unit.

3. The apparatus of claim 1, wherein the detecting unit detects the consumption of and a charge for the developer required for development by the developing unit according to the results of recognition by the recognition unit and the density designated with the first operating unit, and the first control unit displays the consumption and the charge detected by the detecting unit on the display unit.

4. The apparatus of claim 1, wherein the detecting unit detects the consumption of and a charge of or the developer required for development by the developing unit according to the results of recognition by the recognition unit and the density designated with the first operating unit, and the first control unit displays at least one of the consumption and the charge detected by the detecting unit on the display unit.

5. The apparatus of claim 1, wherein the developing unit has different colors of developer for color printing, the detecting unit detects a consumption of developer required for development by the developing unit for each color, and the first control unit displays the consumption by color detected by the detecting unit on the display unit.

6. The apparatus of claim 1, wherein the developing unit has different colors of developer for color printing, the detecting unit detects a consumption of and a charge for developer required for development by the developing unit for each color, end the first control unit displays the consumption and the charge by color detected by the detecting unit on the display unit.

7. The apparatus of claim 1, wherein the developing unit has different colors of developer for color printing, the detecting unit detects a consumption of and a charge for developer required for development by the developing unit for each color, and the first control unit displays at least one of the consumption and the charge by color detected by the detecting unit on the display unit.

8. An image forming apparatus comprising:
   a document mount;
   a document read window;
   a document feed unit which feeds an original document to the document read window;
   an exposure unit provided so that it can reciprocate along the document window and can move to the position opposite the document read window;
   a first reading unit which, when an original document is set on the document mount, reciprocates the exposure unit along the document mount and optically reads the image of the document on the document mount while the exposure unit is moving forwards;
   a second reading unit which, when an original document is set on the document feed unit, stops the exposure unit at the position opposite the document read window and reads the image of the document fed to the document read window through the document read window while operating the document feed unit;
   an image bearing body;
   a scanning unit which optically scans the surface of the image bearing body to form a latent image corresponding to the image read through the document read window on the surface of the image bearing body;
   a developing unit which develops the latent image formed on the surface of the image bearing body by supplying developer to the image bearing body;

a transfer unit which transfers the image on the image bearing body developed by the development unit onto an image forming medium;

a recognition unit which recognizes the density of the image read by either the first reading unit or the second reading unit;

a first operating unit operated by a user for designating the density of the image to be transferred onto the image forming medium;

a detecting unit which detects a consumption of the developer required for development by the developing unit according the results of recognition by the recognition unit and the density designated with the first operating unit;

a display unit;

a first control unit which displays the consumption detected by the detecting unit on the display unit, and a preview of the image to be transferred onto the image forming medium; and a second control unit which changes the density of the image preview displayed on the display unit according to an operation of the first operating unit.

9. The apparatus of claim 8, further comprising;

a second operating unit, operated by the user, which designates satisfaction with the displayed contents on the display unit; and a third control unit which causes the image bearing body, the scanning unit, the developing unit, and the transfer unit to start the operation of image formation.

10. The apparatus of claim 8, wherein the detecting unit detects the consumption of and a charge for the developer required for development by the developing unit according to the results of recognition by the recognition unit and the density designated with the first operating unit, and the first control unit displays the consumption and the charge detected by the detecting unit on the display unit.

11. The apparatus of claim 8, wherein the detecting unit detects the consumption of and a charge for the developer required for development by the developing unit according to the results of recognition by the recognition unit and the density designated with the first operating unit, and the first control unit displays at least one of the consumption and the charge detected by the detecting unit on the display unit.

12. The apparatus of claim 8, wherein the developing unit has different colors of developer for color printing, the detecting unit detects a consumption of developer required for development by the developing unit for each color, and the first control unit displays the consumption by color detected by the detecting unit on the display unit.

13. The apparatus of claim 8, wherein the developing unit has different colors of developer for color printing, the detecting unit detects a consumption of and a charge for developer required for development by the developing unit for each color, and the first control unit displays the consumption and the charge by color detected by the detecting unit on the display unit.

14. The apparatus of claim 8, wherein the developing unit has different colors of developer for color printing, the detecting unit detects a consumption of and a charge for developer required for development by the developing unit for each color, and the first control unit displays at least one of the consumption and the charge by color detected by the detecting unit on the display unit.

15. In an image forming apparatus having a reading unit which reads the image of a document, an image bearing body, a scanning unit which optically scans across the surface of the image bearing body to form a latent image corresponding to the image read by the reading unit on the surface of the image bearing body, a developing unit which supplies developer to the image bearing body to develop the latent image on the surface of the image bearing body, a transfer unit which transfers the image on the surface of the image bearing body developed by the developing unit onto an image forming medium, a recognition unit which recognizes the density of the image read by the reading unit, a first operating unit, operated by a user, which designates the density of the image to be transferred onto the image forming medium, and a display unit, a method of controlling the apparatus comprising:

detecting a consumption of the developer required for development by the developing unit according to the results of recognition by the recognition unit and the density designated with the first operating unit;

displaying the consumption detected by the detecting unit and a preview of the image to be transferred onto the image forming medium on the display unit; and changing the density of the image preview displayed on the display unit according to an operation of the first operating unit.

* * * * *